(No Model.)
G. L. KARR.
COMBINED INSECT TRAP AND VASE.
No. 598,521. Patented Feb. 8, 1898.
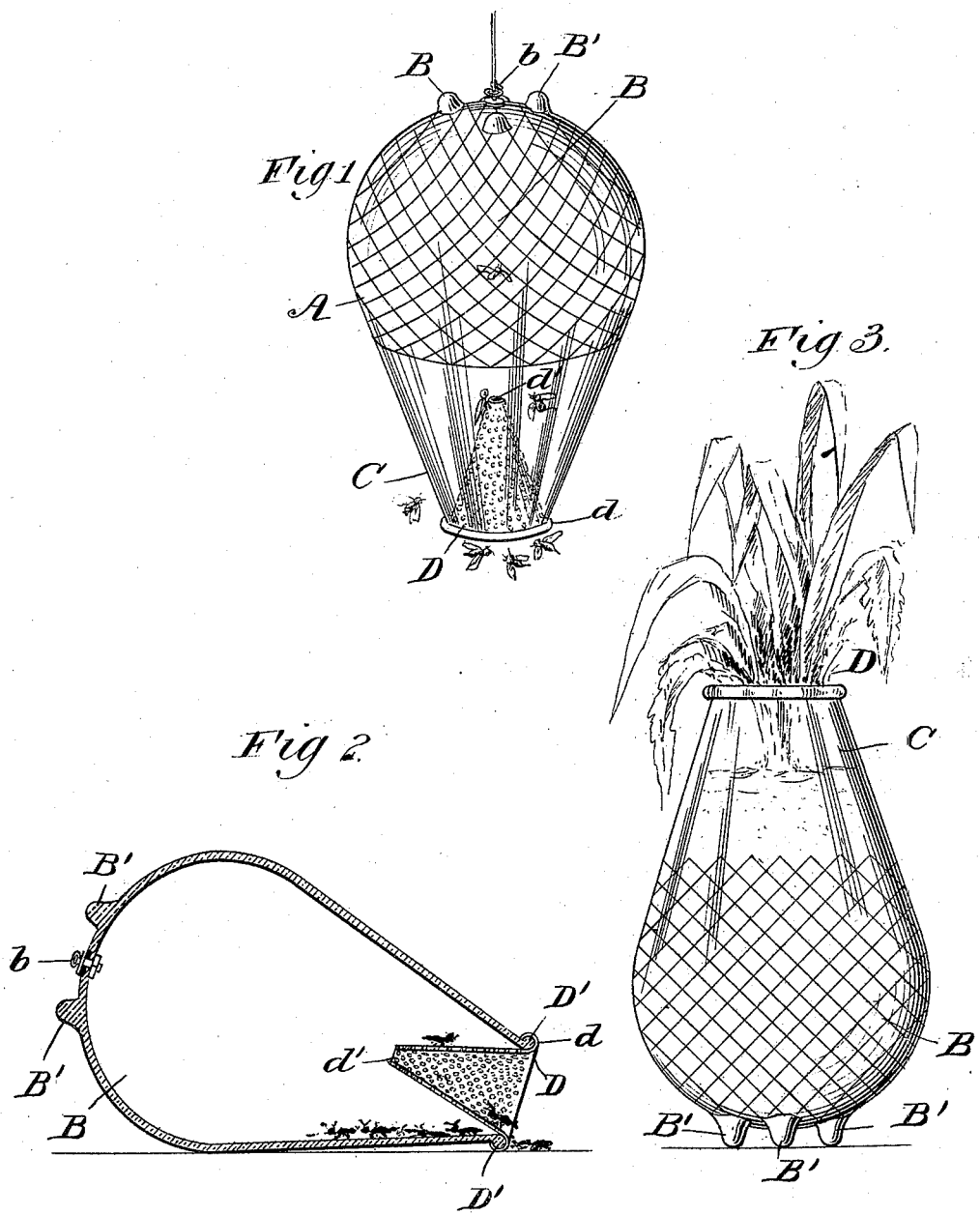

UNITED STATES PATENT OFFICE.

GEORGE L. KARR, OF BROOKLYN, NEW YORK.

COMBINED INSECT-TRAP AND VASE.

SPECIFICATION forming part of Letters Patent No. 598,521, dated February 8, 1898.

Application filed April 17, 1897. Serial No. 632,558. (No model.)

*To all whom it may concern:*

Be it known that I, GEORGE L. KARR, a citizen of the United States, and a resident of Brooklyn, county of Kings, and State of New York, have invented certain new and useful Improvements in a Combined Insect-Trap and Vase, of which the following is a specification, reference being had to the accompanying drawings, forming a part thereof, in which similar letters of reference indicate corresponding parts.

This invention relates to an improved combined insect-trap and vase, the object thereof being to provide a device of such a character that it can readily be converted from a vase into a trap for insects of various kinds, and vice versa, by the removal of some of its parts, the body of which is constructed of transparent material, which makes it available and effective for either use.

The invention will be hereinafter fully described, and specifically set forth in the annexed claims.

In the accompanying drawings, forming part of this specification, Figure 1 is a front elevation of my invention arranged for use as a fly-trap. Fig. 2 is a transverse section of the same when used as a trap for roaches. Fig. 3 is a front elevation of the device in use as a vase for flowers or plants.

In carrying out my invention I make the main hollow portion or body A of glass, molded in the usual way, the same consisting of a bulb B of diminishing size, terminating in a neck C, and upon the mouth of said neck is formed an external peripheral flange or bead D'. The exterior contour of the body or bulb A may be likened to that of an inflated balloon, as shown in Fig. 1.

Upon the larger end portion of the bulb A are formed integrally therewith the legs or supports B', upon which the same stands when it is to be used as a flower vase or receptacle, a headed bolt b, passing through the center of the large end of the bulb and secured thereto by any suitable means, furnishing a means for suspending it from a gas-fixture or other support in the ceiling, or a headed lug for that purpose may be mounted thereon.

A metallic perforated cone D, upon the larger end of which is formed an extended curved peripheral flange d, is inserted within the neck of the bulb, and the flange d of the said cone is sprung into engagement with the bead D' upon the mouth D of the bulb. The tapered end of the cone has an aperture d' therein. The said cone may also be formed of wire-gauze, which will answer the purpose for which it is intended as well as the perforated metal. With this conical attachment in position in the neck, as above described, the bulb becomes a fly-trap, which may be suspended, as in Fig. 1. The flies entering the mouth of the trap travel up in search of the food placed inside as a bait, and passing through the small end thereof are imprisoned therein, and in their efforts to escape fly upward toward the light entering the glass bulb. By laying the bulb on its side upon a floor or shelf, as seen in Fig. 2, the fly-trap becomes a trap for roaches and other vermin of the kind.

When the bulb or balloon is to be used as a vase or receptacle for flowers or plants, as seen in Fig. 3, the cone attachment is released from the mouth D and the large end is by means of its supporting-legs adapted to stand firmly on a table, and the receptacle or bulb can then be supplied with water and flowers placed therein. By this bulbous or balloon-like construction of the main portion of the device, to which the perforated cone can be easily applied, a convertible and useful article for household use is supplied, which is cheap and effective in operation and adapted for various purposes.

The outer surface of the glass bulb may be ornamented in any desired manner, thus giving the said article a pleasing appearance.

Having thus described my invention, what I claim as new, and desire to secure by Letters Patent, is—

1. A convertible fly-trap and vase, the same comprising a bulbous body portion having a neck and beaded mouth thereon, legs or projections upon the larger end and means for suspending the same, in combination with a perforated attachment for said neck and means for securing the same therein, substantially as shown and described.

2. In a convertible flower-vase and insect-trap of the character described, the bulb or balloon shaped glass body provided with legs and means for suspending the same upon the larger end and the smaller end having a neck and beaded mouth adapted to receive a perforated cone, substantially as shown and described.

3. A combined vase and insect-trap of glass, comprising the bulb or body having legs thereon, a flanged neck and a perforated metallic cone connected interiorly to said neck and means for suspending the bulb, substantially as shown and described.

In testimony that I claim the foregoing as my invention I have signed my name, in presence of two witnesses, this 14th day of April, 1897.

GEORGE L. KARR.

Witnesses:
C. SEDGWICK,
B. McCOMB.